United States Patent [19]

Gilmour

[11] Patent Number: 5,339,283
[45] Date of Patent: Aug. 16, 1994

[54] APPARATUS AND METHOD FOR MEASURING VELOCITY

[75] Inventor: George A. Gilmour, Severna Park, Md.

[73] Assignee: Westinghouse Electric Corp., Pittsburgh, Pa.

[21] Appl. No.: 105,574

[22] Filed: Aug. 13, 1993

[51] Int. Cl.$^5$ .............................................. G01S 15/58
[52] U.S. Cl. ...................................................... 367/89
[58] Field of Search ............... 367/89, 90, 91; 73/488, 73/181; 364/565

[56] References Cited

U.S. PATENT DOCUMENTS

| | | | |
|---|---|---|---|
| 3,066,279 | 6/1958 | Marks | 367/89 |
| 4,244,026 | 1/1981 | Dickey, Jr. | 364/565 |

Primary Examiner—Daniel T. Pihulic

[57] ABSTRACT

An apparatus for measuring velocity relative to a reference plane having a linear sonar array disposed in parallel with the direction of travel and including from the foremost position to the rearmost position a first transmitter, a plurality of first receivers, a second transmitter, and a plurality of second receivers. The second transmitter is controlled to transmit a sonar pulse after a predetermined time delay has lapsed since the first transmitter transmitted a sonar pulse. The predetermined time delay is selected such that the second transmitter transmits the sonar pulse when the second transmitter occupies the position which the first transmitter occupied when it transmitted the first sonar pulse. A first set of reception signals, which are generated by the plurality of first receivers in response to reception of echoes of the first sonar pulse reflected from the bottom, is delayed for the predetermined time delay, and then correlated with a second set of reception signals, which are generated by the plurality of second receivers in response to reception of echoes of the second sonar pulse reflected from the bottom. Based on the result of the correlation, the predetermined time delay may be adjusted. The velocity is then determined and displayed. The process is repeated to continually update the velocity.

20 Claims, 14 Drawing Sheets

APPARATUS AND METHOD FOR MEASURING VELOCITY

BACKGROUND OF THE INVENTION

1. Field of the Invention

The present invention relates to an apparatus and method for measuring velocity. More particularly, the present invention relates to a velocity correlator utilizing side-looking sonar (SLS) which is useful in underwater vehicles for measuring speed relative to the bottom.

2. Discussion of the Related Art

One conventional technique used in measuring the speed at which an underwater vehicle is travelling relative to the bottom is the Doppler sonar method. To measure the forward velocity of the underwater vehicle using the Doppler sonar technique, two sonar projectors are used which are positioned such that one of the projectors projects a sonar beam in the forward direction and the other projects a sonar beam in the aftward direction of the vessel. When the vessel is moving forward, the received echo of the fore directed beam will exhibit an upward shift in Doppler frequency and the received echo of the aft directed beam will exhibit a downward shift in Doppler frequency. The faster the vessel moves in one direction, the greater the shifts in Doppler frequency. Thus, the velocity of the vessel may be determined by measuring the shifts in Doppler frequency.

The Doppler sonar technique is susceptible to error, however, since the wide beams have spreads of Doppler shifts and the bottom scattering characteristics are not always uniform. Also, bottom slopes cause errors.

In an effort to provide for greater range to the bottom, the correlation velocity log sonar was developed. The correlation velocity log sonar utilizes a single sonar projector which projects a sonar beam vertically downward. A pair of receivers, which are directed downward and spaced apart from one another along the longitudinal axis of the vessel, sense the echo from the projected sonar beam and provide identical output waveforms. When the vessel is moving forward, the aft receiver will sense the echo after the forward receiver causing the output wave form of the aft receiver to be delayed from that of the forward receiver. This delay is equal to the distance between the two receivers divided by twice the velocity of the vessel. Thus, the velocity of the vessel may be determined by measuring the delay between the output signals of the fore and aft positioned receivers having a fixed distance therebetween or, alternatively, by fixing the measurable delay time and altering the spacing between the fore and aft receivers.

Because it is necessary that the delay in which the aft receiver receives the same return echo as the fore receiver is determined precisely, and because the return echo received by the receivers varies when a continuous wave is transmitted by the projector, it is necessary to correlate the output waveforms of the fore and aft receivers and to determine what delay or spacing is required to maximize the correlation.

When the fore and aft positioned receivers have a single fixed distance therebetween, it is necessary to vary a delay introduced into the output waveform of the fore receiver until a correlation of the delayed output waveform of the fore receiver and the output waveform of the aft receiver is maximized. The delay introduced into the output waveform of the fore receiver and the distance between the fore and aft receivers can then be used to calculate the velocity of the vessel.

As an alternative method, the spacing between the fore and aft receivers can effectively be altered by replacing the single aft receiver with an array of receivers having identifiable fixed spacings between each receiver of the array and the forward receiver. Then, by fixing the delay introduced into the output waveform of the fore receiver, the output waveform of the fore receiver is correlated with the output waveform of each of the aft receivers. The correlations are compared to determine which of the aft receivers has output a waveform that has the maximum correlation with the output waveform of the fore receiver. The distance between the fore receiver and the aft receiver having maximum correlation is then used to determine the velocity of the vessel. Further, to more accurately determine the proper spacing, the spacings between the fore receiver and the aft receivers having the two highest levels of correlation may be used to interpolate the proper spacing.

Doppler sonar and correlation velocity log sonar have, at best, accuracies of approximately 0.05 knot.

SUMMARY OF THE INVENTION

Accordingly, the present invention has been made in view of the above circumstances and provides an apparatus and method for measuring velocity having greater accuracy than Doppler sonar and correlation velocity log sonar.

Additional advantages of the invention will be set forth in part in the description which follows and in part will be apparent from the description, or may be learned by practice of the invention. The objects and advantages of the invention may be realized and attained by means of the instrumentalities and combinations particularly pointed out in the written description and claims hereof as well as the appended drawings.

To achieve these and other advantages and in accordance with the purpose of the invention, as embodied and broadly described herein, the apparatus for measuring velocity relative to a reference plane, of this invention includes a linear sonar array disposed parallel to a direction along which velocity components are to be measured, including from a foremost position to a rearmost position first transmitting means for transmitting a first sonar pulse, a plurality of first receiving means for receiving the first sonar pulse and for issuing first reception signals in response thereto, second transmitting means for transmitting a second sonar pulse, and a plurality of second receiving means for receiving the second sonar pulse and for issuing second reception signals in response thereto, the plurality of second receiving means corresponding in number to the plurality of first receiving means, control means for transmitting a first control signal to the first transmitting means causing the first transmitting means to transmit the first sonar pulse, and for transmitting a second control signal to the second transmitting means after a predetermined time delay has lapsed following the transmission of the first control signal, the predetermined time delay being determined such that the second transmitting means is controlled to transmit the second sonar pulse when the second transmitting means is in the same position relative to the reference plane which the first transmitting means was in when the first transmitting means transmitted the first sonar pulse, and signal processing means for delaying the first reception signals by an amount of time equal to the predetermined time delay, and for correlating the delayed first reception signals with the second reception signals, wherein the control means adjusts the predetermined time delay based upon the correlation result in order to ensure that the second transmitting means is controlled to transmit the second sonar pulse when the second transmitting means is in the same position relative to the reference plane which the first transmitting means was in when the first transmitting means transmitted the first sonar pulse.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate several embodiments of the invention and, together with the description, serve to explain the objects, advantages, and principles of the invention. In the drawings.

DETAILED DESCRIPTION OF THE PREFERRED EMBODIMENTS

Reference will now be made in detail to the present preferred embodiments of the invention, examples of which are illustrated in the accompanying drawings.

Figure 1:
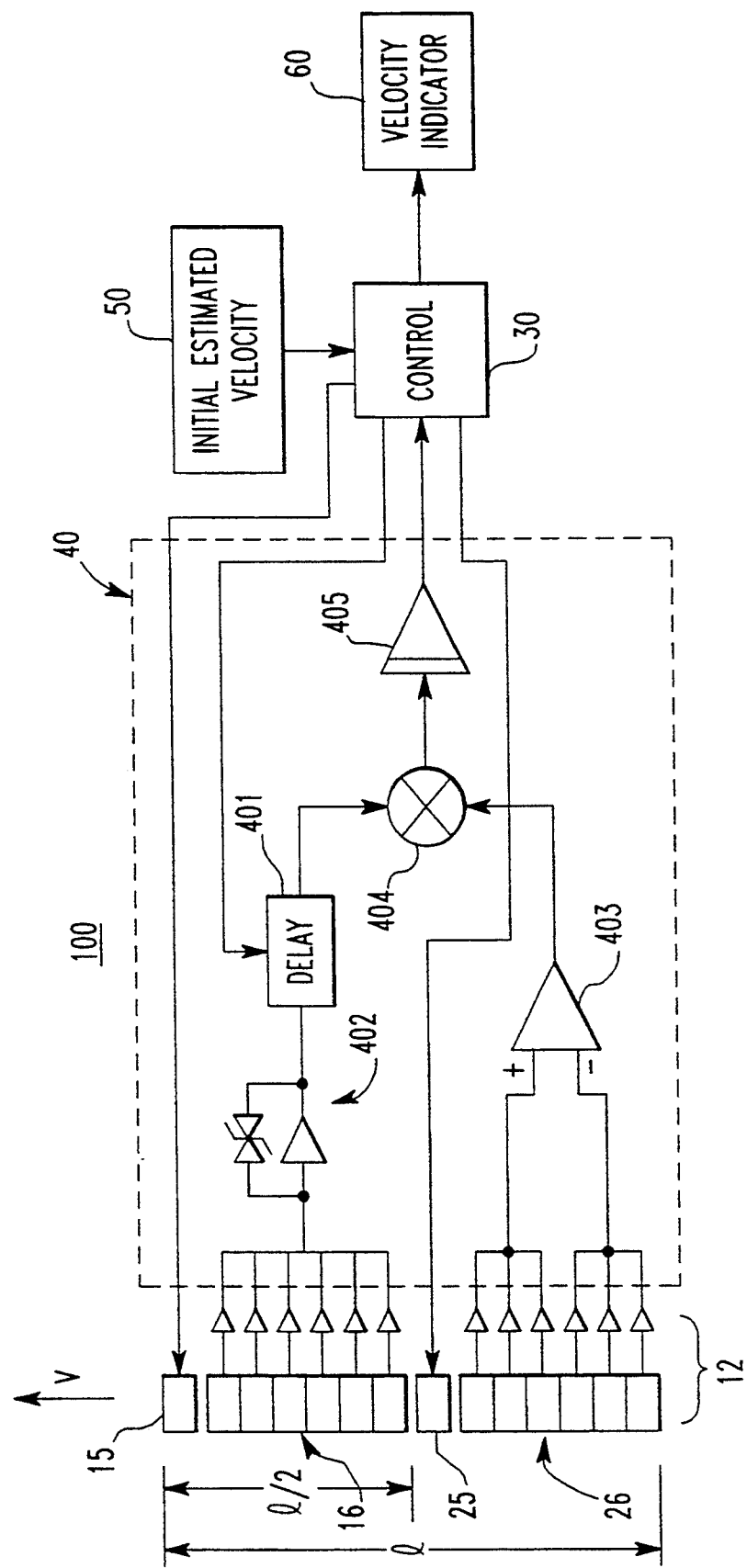
FIG. 1 is a schematic illustration of a first embodiment of the present invention.

The first exemplary embodiment of the velocity measuring apparatus of the present invention is shown in FIG. 1 and is designated generally by the reference numeral 100. Velocity measuring apparatus 100 generally includes a linear sonar array 12, control means 30, signal processing means 40, and a velocity indicator 60. Velocity measuring apparatus 100 may further include means for providing an initial estimate of a vessel's velocity 50.

Linear sonar array 12 is disposed parallel to a direction along which velocity (V) components are to be measured. From a foremost position to a rearmost position, linear sonar array 12 includes first transmitting means 15 for transmitting a first sonar pulse, a plurality of first receiving means 16 for receiving the first sonar pulse and for issuing first reception signals in response to the first sonar pulse, second transmitting means 25 for transmitting a second sonar pulse, and a plurality of second receiving means 26 for receiving the second sonar pulse and for issuing second reception signals in response thereto. The first receiving means 16 and second receiving means 26 having the same number of receiving elements.

The plurality of first and second receiving means 16 and 26, respectively, each include a transducer and a preamplifier. The preamplifiers are preferably time-varied gain (TVG) preamplifiers so that the received signals may be normalized from close to long range.

As embodied herein, control means 30 preferably comprises a microprocessor or the like. In general, control means 30 controls the transmission of sonar pulses output by linear sonar array 12 and controls signal processing means 40 to process the signals output from linear sonar array 12 in such a manner that control means 30 may control velocity indicator 60 to output an accurate measurement of a vessel's velocity.

In operation, signal processing means 40 receives the reception signals from linear sonar array 12 and processes the reception signals under control of control means 30, and outputs a signal to control means 30 indicative of adjustments to be made to accurately determine a vessel's velocity. As further embodied herein, signal processing means 40 comprises delay means 401, hard limit means 402, subtracting means 403, a multiplier 404, and an integrator 405. Delay means 401 preferably comprises a buffer-type memory or the like, and subtracting means 403 may comprise a differential amplifier.

Figure 2:
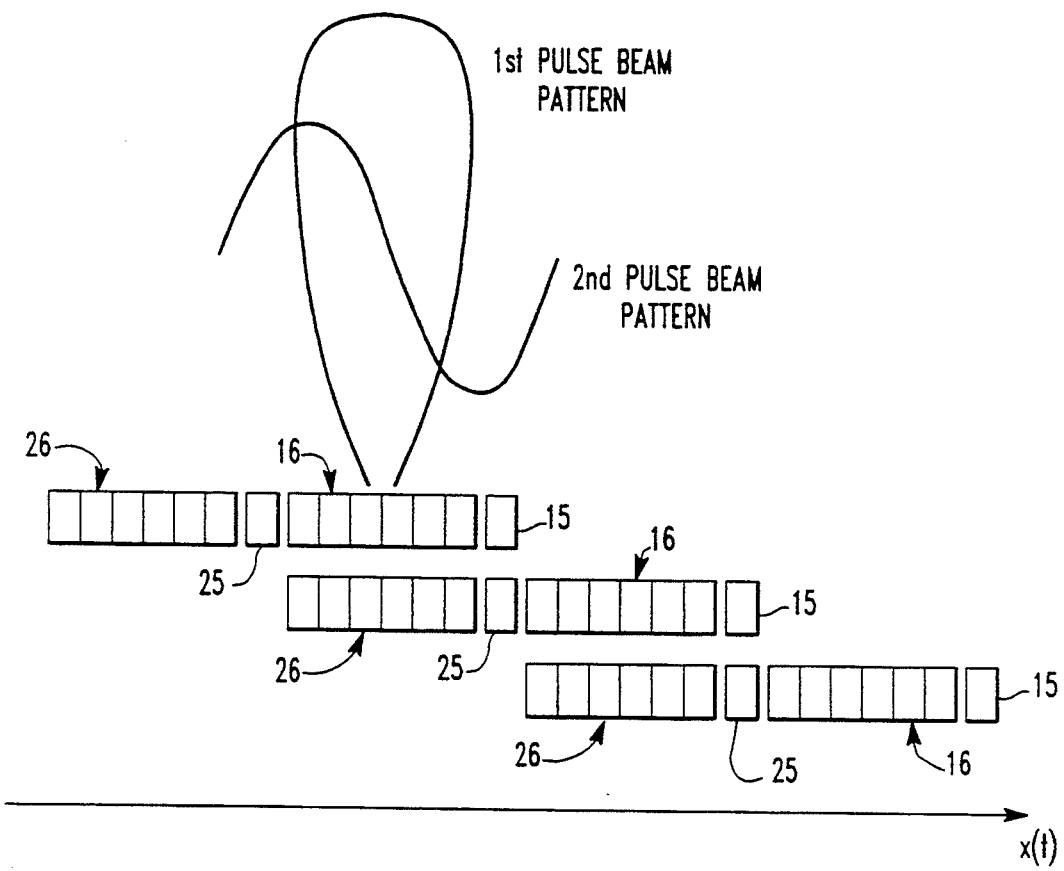
FIG. 2 is a diagram illustrating an overview of the operation of the first embodiment of the present invention.

An overview of the operation of the first embodiment of the present invention will now be described with reference to FIGS. 1 and 2.

First transmitting means 15 transmits a first sonar pulse at a specific instant in time. The echo signals reflected from the bottom are received on the plurality of first receiving means 16 which output first reception signals. The first reception signals are summed together to provide a first pulse beam pattern. A representation of one possible example of the first pulse beam pattern is shown in FIG. 2 as "1st PULSE BEAM PATTERN".

Linear sonar array 12 moves through the water as the echo signal comes in from longer ranges. At some time D after transmission of the first sonar pulse (after the echo signal has arrived from maximum range), linear sonar array 12 has moved to the second position shown in FIG. 2 (vertically offset for clarity). A second sonar pulse is transmitted from second transmitting means 25 when it is estimated to be in the same position formerly occupied by first transmitting means 15 when it transmitted the first sonar pulse.

The echo of the second sonar pulse is received by the plurality of second receiving means 26 which output second reception signals. One half of the second reception signals are subtracted from the other half using subtracting means 403, to provide a second pulse beam pattern. A representation of one possible example of the second pulse beam pattern is shown in FIG. 2 as "2nd PULSE BEAM PATTERN". If the second sonar pulse is transmitted at the correct time, each of the second receiving means 26 occupies a position formerly occupied by a corresponding one of the plurality of first receiving means 16 when the echo of the first sonar pulse was received. The third position shown in FIG. 2 is the position the linear sonar array 12 is in at a time D after the second transmission (after the echo of the second sonar pulse has arrived from maximum range) (vertically offset for clarity).

Figure 3:
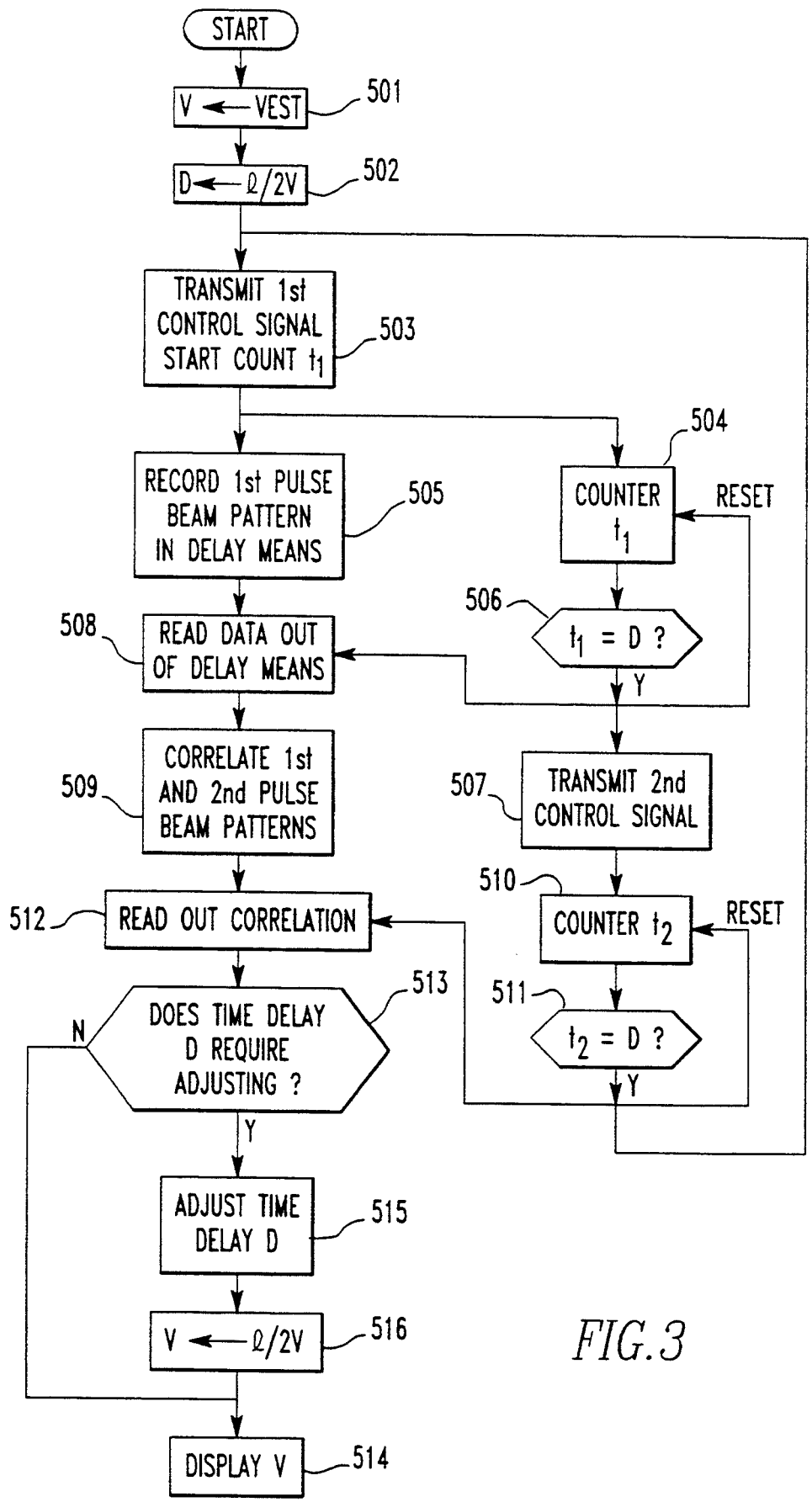
FIG. 3 is a flow chart illustrating the operation of the control means of the first embodiment of the present invention.

The details of the operation of above described invention are hereinafter described. First the operation of control means 30 will be described with reference to FIG. 3.

When velocity measuring apparatus 100 is initially put into operation, control means 30 receives an initial estimated velocity $V_{est}$ from a conventional velocity measuring device 50 and assigns $V_{est}$ to measured velocity V (Step 501). Using $V_{est}$, control means 30 calculates a time delay (D) based on the following equation (Step 502):

$$D=(l/2)/V \qquad (1)$$

where l is the total length of linear sonar array 12 and l/2 is the spacing between first transmitting means 15 and second transmitting means 25. It should be apparent from equation (1) that the time delay D is calculated to be equal to the time it takes for the vessel to travel a distance l/2 at velocity V.

After the foregoing initialization steps, control means 30 transmits a first control signal to first transmitting means 15 causing first transmitting means 15 to transmit a first sonar pulse (Step 503). Simultaneous with the transmission of the first control signal, control means 30 starts a first counter (Step 504) which increments the value $t_1$ until it reaches a value equal to time delay D. Also, delay means 401 is turned on (Step 505) to record the first sonar pulse receive echo.

Control means 30 checks the value $t_1$ of the first counter to determine whether it has reached the value time delay D (Step 506). Once the value $t_1$ of the first counter has reached the value time delay D, control means 30 transmits a second control signal to second transmitting means 25 causing second transmitting means 25 to transmit a second sonar pulse (Step 507). Hence, assuming the initial estimated velocity $V_{est}$ was accurate, second transmitting means 25 transmits the second sonar pulse when it is in the same relative position which first transmitting means 15 was in when it transmitted the first sonar pulse. Simultaneously, the sonar data from the first transmit pulse is read out of delay means 401 (Step 508) so that the sonar data from the first transmit pulse may be correlated with that of the second pulse (Step 509).

An echo of the second sonar pulse will be received by second receiving means 26 and processed at the same time control means 30 releases the sum of the first reception signals (first pulse beam pattern) from delay means 401. One half of the second reception signals are subtracted from the other half to provide the second pulse beam pattern, an example of which is shown in FIG. 2. Thus, the first and second pulse beam patterns may be correlated by signal processing circuit 40 (Step 509). The delayed sum of the first reception signals represents the first pulse beam pattern, an example of which is shown in FIG. 2.

At the time of the second transmission, control means 30 starts a second counter (Step 510) which increments the value $t_2$ until it reaches a value equal to time delay D (Step 511).

Once control means 30 determines that $t_2$ is equal to time delay D, control means 30 causes the correlation of the first reception signals being read out of delay means 401 and the incoming second reception signals to stop and be read out (Step 512).

After signal processing means 40 has provided control means 30 with the result of the correlation, control means 30 determines whether the time delay D needs to be adjusted based upon the result of the correlation (Step 513). If the time delay D does not require adjusting, the value of V, which initially is $V_{est}$ is output to velocity indicator 60 (Step 514) and the process is repeated starting with Step 503 until the apparatus is turned OFF.

If the first and second pulse receive signals do not properly correlate, it is because the value of the velocity V was not accurate causing the time delay D to be calculated to a value which does not equal the time at which it took for the vessel to move a distance l/2. Hence, the second sonar pulse is transmitted either too early or too late.

In the first embodiment of the invention as illustrated in FIG. 1, the second pulse beam pattern is formed by subtracting one half of the reception signals provided from the plurality of second receiving means 26 from the other half. When the second pulse receive signal is correlated with the first pulse receive signal, the average result for perfect positioning should be zero. For the second pulse beam pattern depicted in FIG. 2, a positive correlation would indicate that the beam pattern of the second sonar pulse was too far forward and a negative result would indicate that beam pattern of the second sonar pulse was too far aft.

Figure 4:
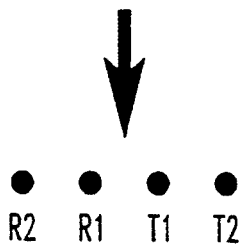
FIG. 4 is a diagram illustrating the relation between an error in the transmit position (T2) of the second sonar pulse and an error in the receive position (R2) of the echo of the second sonar pulse.

FIG. 4 illustrates the relation between an error in the transmit position (T2) of the second sonar pulse and an error in the receive position (R2) of the echo of the second sonar pulse. Because the phase center for the T2-R2 pair is identical to the phase center for the T1-R1 pair, when the transmit position (T2) of the second sonar pulse is in error by the distance between T1 and T2, the position (R2) of the echo of the second sonar pulse having the best correlation with the echo of the first sonar pulse (R1) will be in error in the opposite direction. Therefore, when the correlation result is positive, the echo of the second sonar pulse was too far forward and the second sonar pulse was transmitted too far aft. Hence, control means 30 would determine that the time delay D would need to be increased.

When the correlation result is negative, the echo of the second sonar pulse was too far aft and the second sonar pulse was transmitted too far forward. Hence, control means 30 would determine that the time delay D would need to be decreased.

The amount by which the time delay would be adjusted may be determined using a variety of methods. In the preferred method, control means 30 simply acts as a servo loop and increases or decreases the value of time delay D by a predetermined unit of time (Step 515). In this manner, the time delay D can be continually incremented or decremented by repeating the process until the result of the correlation is zero.

After each adjustment is made to the time delay D, the value of the velocity V is updated using the following equation (Step 516):

$$V=l/2D \qquad (2)$$

where D is now the adjusted time delay. The recalculated value V is output from control means 30 to velocity indicator 60 (Step 514) and the process is repeated starting with Step 503 until the apparatus is turned OFF. Thus, the velocity can be continually updated as long as it is desired to do so.

Typically, a side-looking sonar (SLS) might have 1000 resolution cells per transmit cycle (2D). The time delay D used in the present invention to determine velocity would typically be 0.5 seconds. Therefore, 2,000 resolution cells could be processed to determine the best velocity estimate. This is several orders of magnitude higher than that of a correlation velocity log sonar. Thus, the velocity estimate can be significantly improved over the present state of the art.

Figure 5:
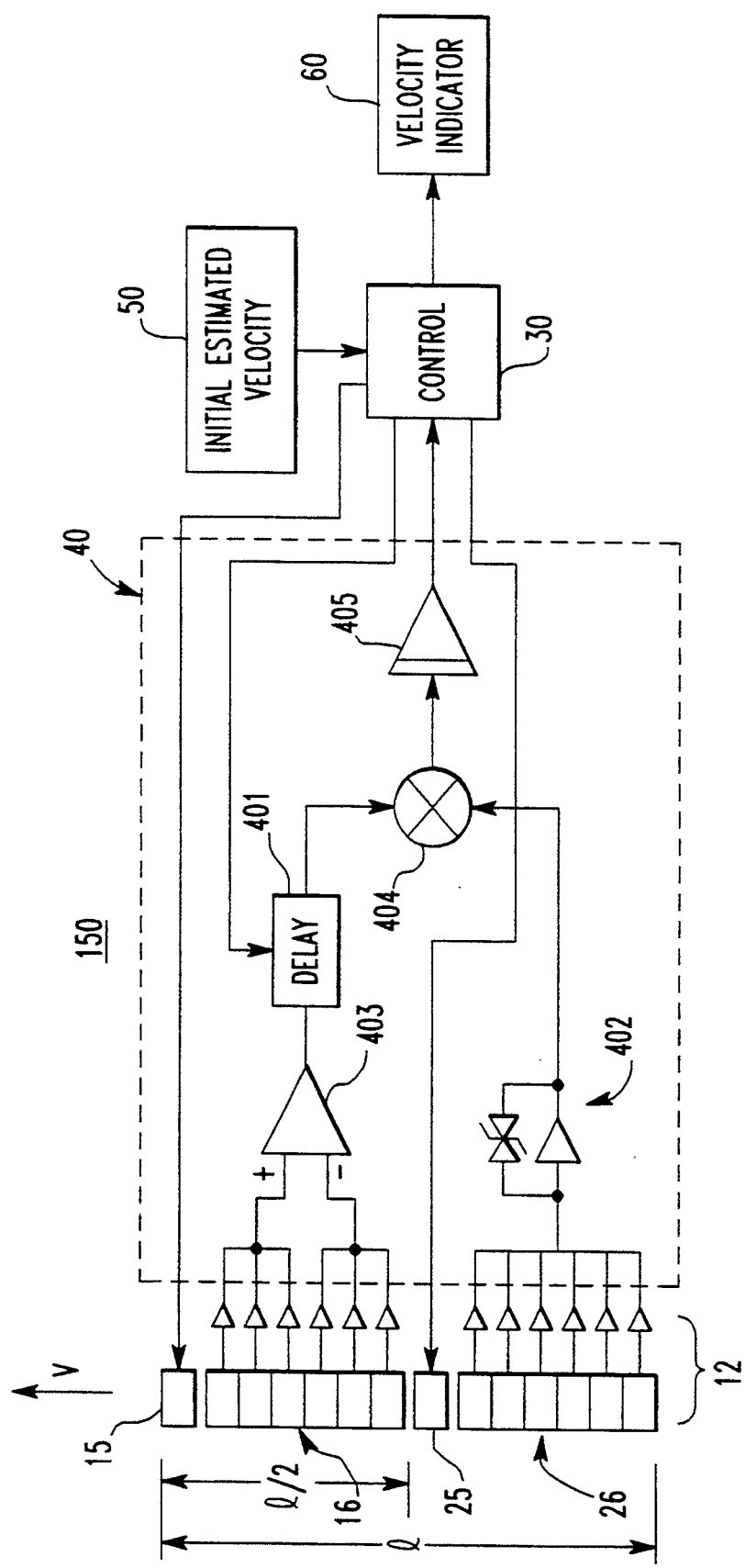
FIG. 5 is a schematic illustration of a modified version of the first embodiment of the present invention.

Velocity measuring apparatus 100 of the first embodiment can be modified such that a difference beam is formed on the first transmission, then delayed for correlation with sum of the second reception signals. A modified version of the second embodiment is shown in FIG. 5 and is designated generally by the reference numeral 150.

Figure 6:
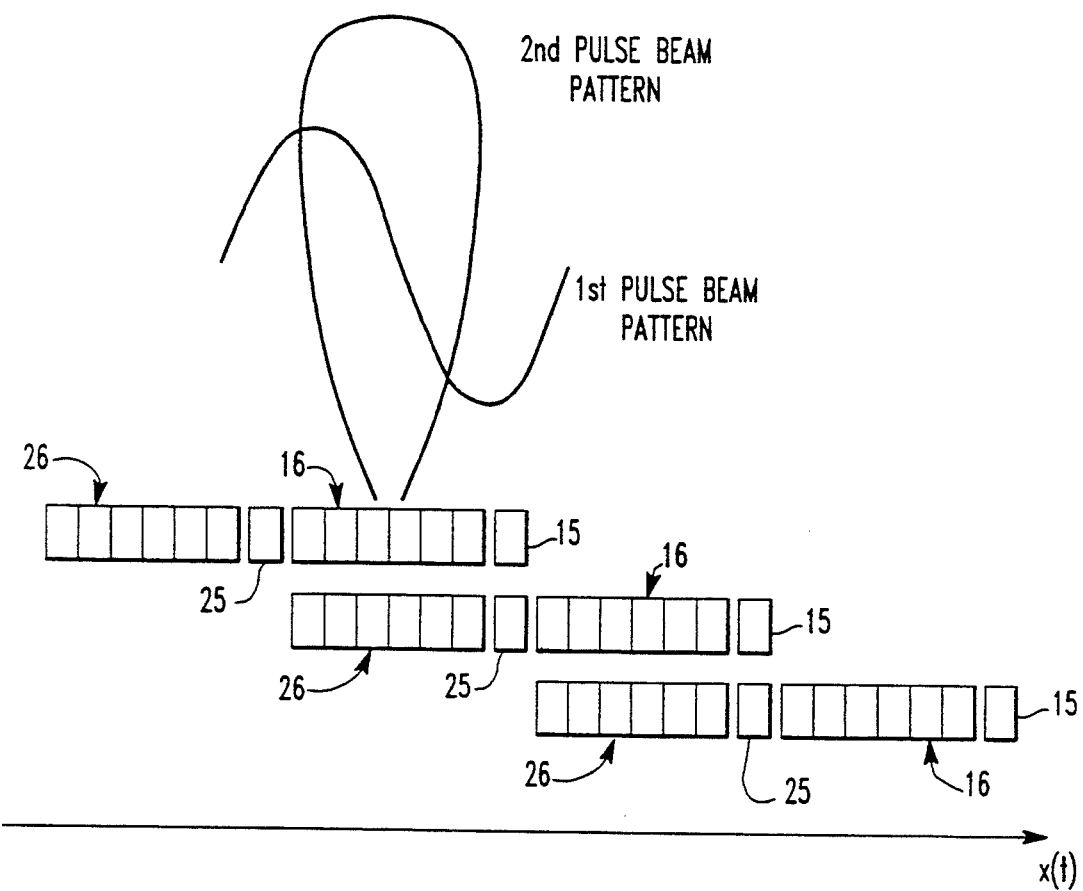
FIG. 6 is a diagram illustrating an overview of the operation of the modified version of the first embodiment of the present invention.

FIG. 6 shows examples of the pulse beam patterns for the modified version of the first embodiment. This is identical to FIG. 2 except that the labels on the patterns have been interchanged between "1st" and "2nd".

A second embodiment of the invention will now be described with reference to FIGS. 7-11 where like or similar parts are identified throughout the drawings by the same reference characters.

Figure 7:
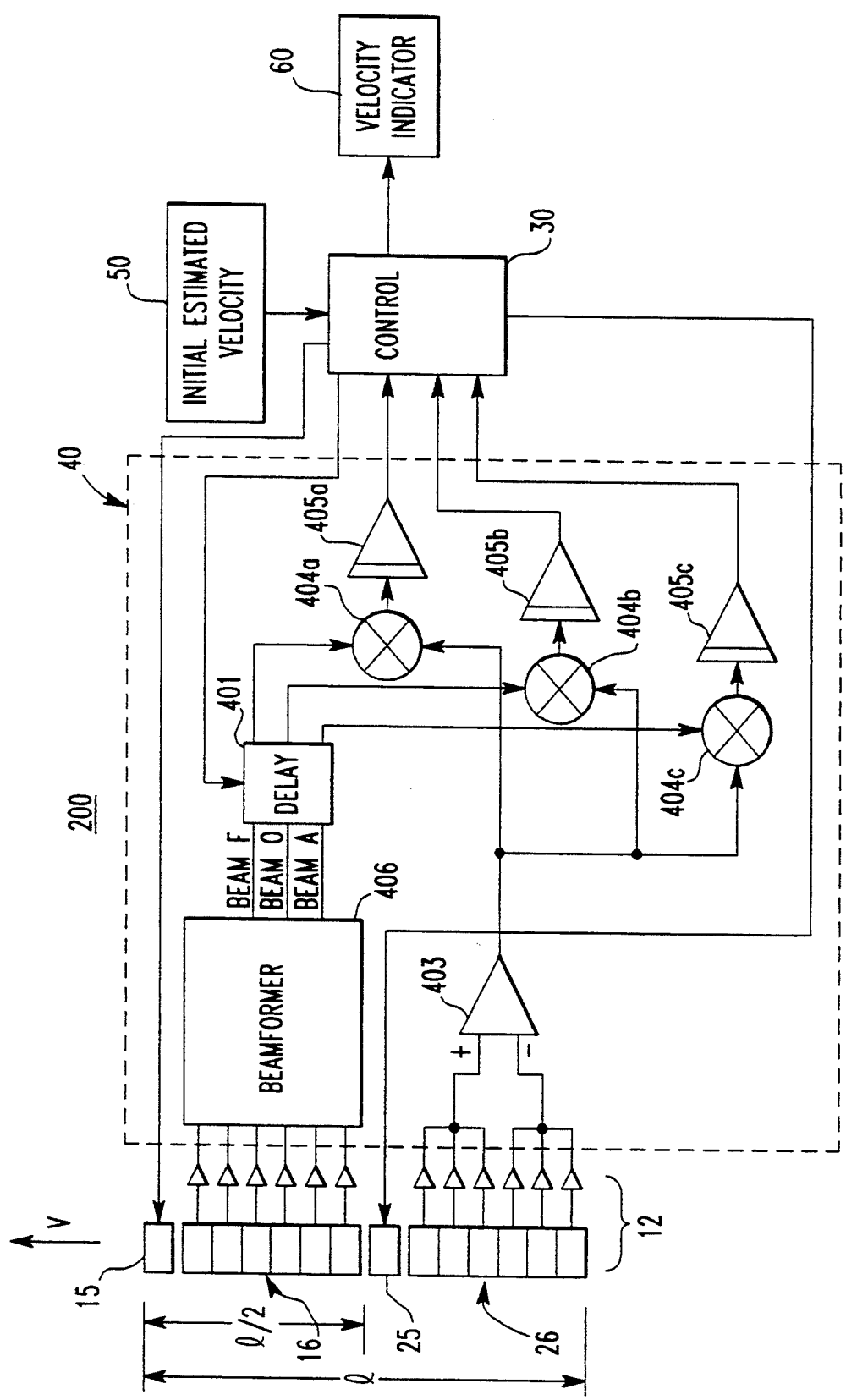
FIG. 7 is a schematic illustration of a second embodiment of the present invention.

The second embodiment of the velocity measuring apparatus of the present invention is shown in FIG. 7 and is designated generally by the reference numeral 200. Similar to the first embodiment, the second embodiment of velocity measuring apparatus 200 generally includes a linear sonar array 12, control means 30, signal processing means 40, and a velocity indicator 60. Velocity measuring apparatus 100 may further include means for providing an initial estimate of a vessel's velocity 50. However, in the second embodiment, signal processing means 40 is modified such that it does not include hard limit 402, and such that it additionally includes beamforming means 406 which forms three parallel beams, a forward beam F, a center beam O, and an aft beam A. Further, multiplier 404 and integrator 405 of the signal processing means 40 of the first embodiment are replaced with first, second, and third multipliers 404a, 404b, and 404c, and first, second, and third integrators 405a, 405b, and 405c, respectively.

Beamforming means 406 may be any conventional beamformer capable of forming three parallel beams. An example of such a beamformer is described in U.S. Pat. No. 3,950,723 by G.A. Gilmour, which is incorporated herein by reference.

Figure 8:
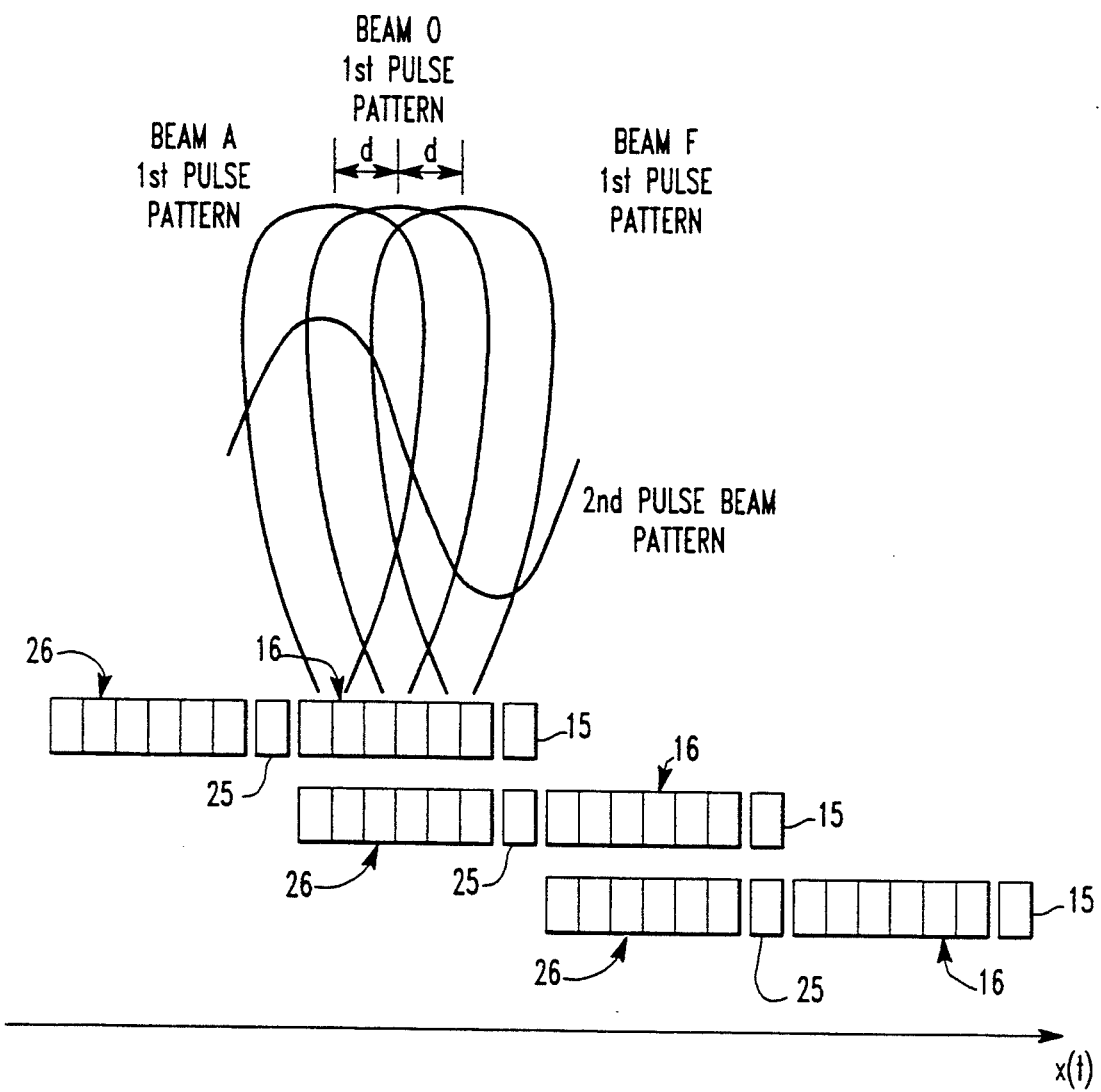
FIG. 8 is a diagram illustrating an overview of the operation of the second embodiment of the present invention.

An overview of the operation of the second embodiment of the present invention will now be described with reference to FIGS. 7 and 8.

First transmitting means 15 transmits a first sonar pulse at a specific instant in time. The echo signals reflected from the bottom are received on the plurality of first receiving means 16 which output first reception signals. The first reception signals are beamformed into three beams and are stored in delay means 401. The three beams are represented in FIG. 8.

Linear sonar array 12 moves through the water as the echo signal comes in from longer ranges. After a time D, linear sonar array 12 has moved to the second position shown in FIG. 8 (vertically offset for clarity). A second sonar pulse is transmitted from second transmitting means 25 when it is estimated to be in the same position formerly occupied by first transmitting means 15 when it transmitted the first sonar pulse. The echo of the second sonar pulse is received by the plurality of second receiving means 26 which output second reception signals. One half of the second reception signals are subtracted from the other half using subtracting means 403, to provide a second pulse beam pattern. A representation of one possible example of the second pulse beam pattern is shown in FIG. 8 as "2$^{nd}$ PULSE BEAM PATTERN". If the second sonar pulse is transmitted at the correct time, each of the second receiving means 26 occupies a position formerly occupied by a corresponding one of the plurality of first receiving means 16 when the echo of the first sonar pulse was received. The third position shown in FIG. 8 is the position the linear sonar array 12 is in when the echo of the second sonar pulse arrives from maximum range (vertically offset for clarity).

The differences in operation of the first and second embodiments of the present invention are hereinafter described.

In the signal processing means 40 of the second embodiment, the signals from the three beams from the first reception are output in parallel following the delay D. The forward beam signal is connected to first multiplier 404a, the center beam signal is connected to second multiplier 404b, and the aft beam signal is connected to third multiplier 404c.

Although it is not required, it is preferable that the forward and aft beams be equally spaced relative to the center beam.

The output of subtracting means 403 is branched into three paths and is provided to first, second, and third multipliers 404a, 404b, and 404c in order to allow the second pulse beam pattern to be correlated with the center beam signal and the forward and aft beam signals. The outputs of first, second, and third multipliers 404a, 404b, and 404c are respectively supplied to first, second, and third integrators 405a, 405b, and 405c. After integration, the outputs of the first, second, and third integrators 405a, 405b, and 405c are supplied to control means 30 for interpolation of the three outputs (i.e., correlation results) to determine the best correlation point.

The center beam signal from the first pulse beam pattern is intended to be the best estimate for providing a correlation result which is equal to zero. However, if the initial estimated velocity is not accurate, the correlation of the center beam signal and the second pulse beam pattern output from subtracting means 403 will not have a result of zero. Hence, it is necessary to determine where a zero-crossing position is for the correlation result.

Figure 9:
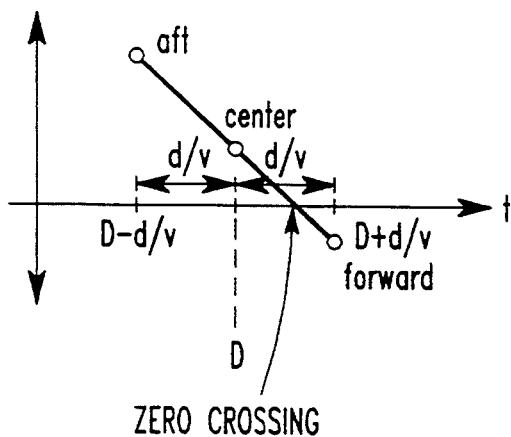
FIG. 9 is a graphic representation of the correlation result value as a function of time for the second embodiment of the present invention.

The zero-crossing position can be interpolated from the data of the three received pulse beam patterns to provide an accurate estimate of the best correlation point. An example of the this method is illustrated in FIG. 9.

Once the best correlation point is determined, the adjusted time delay D may be interpolated. For example, assuming the best correlation point (i.e., zero crossing point) is estimated to have occurred half way between the center beam signal and the forward beam signal, the adjusted time delay would be equal to $D+\frac{1}{2}d/V$.

Then, the value of the velocity V is updated using equation (2) above where D is the adjusted time delay. The recalculated value V is output from control means 30 to velocity indicator 60 and the process is repeated starting with Step 503 until the apparatus is turned OFF.

Figure 10:
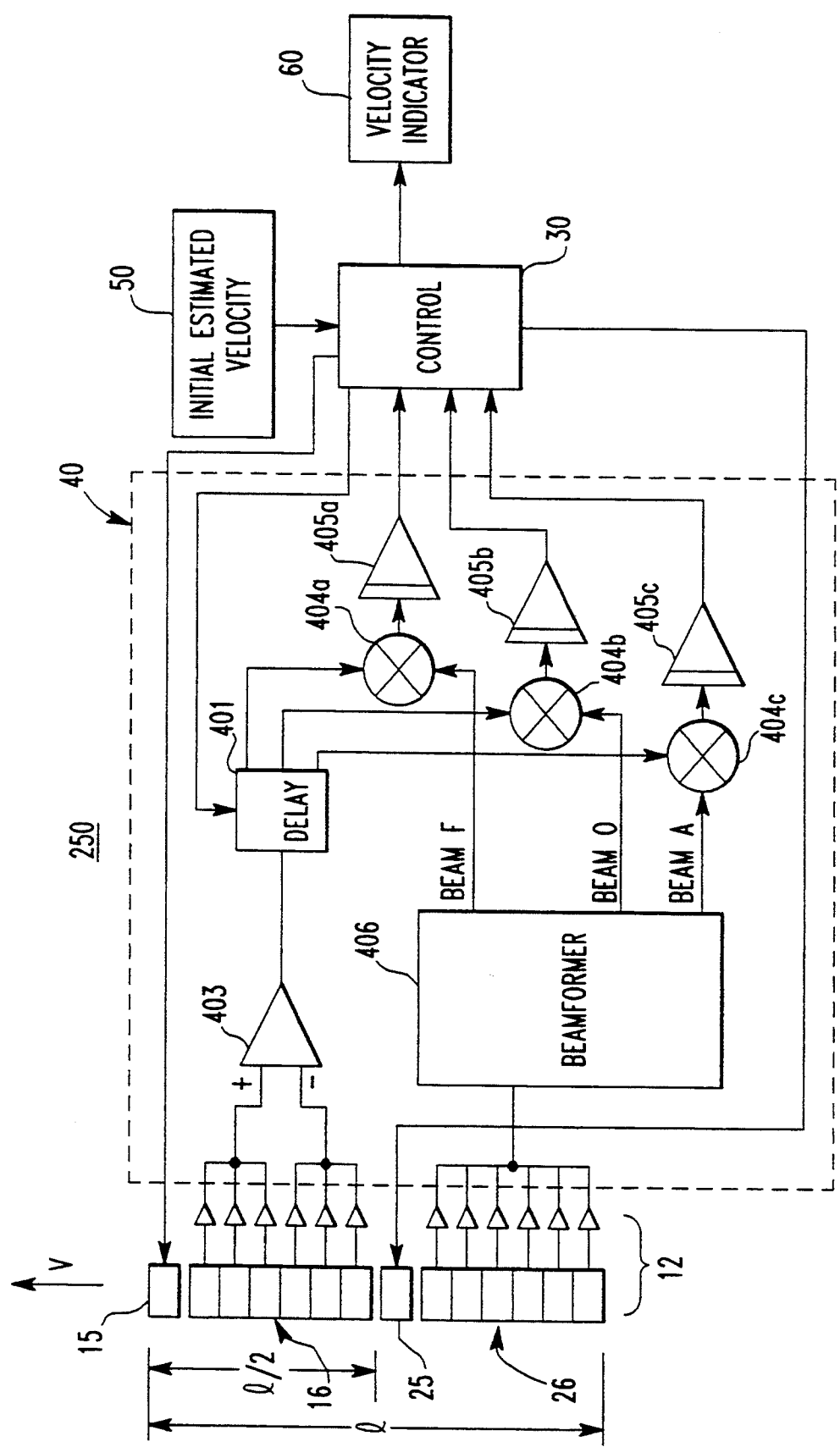
FIG. 10 is a schematic illustration of a modified version of the second embodiment of the present invention.

Velocity measuring apparatus 200 of the second embodiment can be modified such that a difference beam is formed on the first transmission, then delayed for correlation with the three beams formed on the second transmission. A modified version of the second embodiment is shown in FIG. 10 and is designated generally by the reference numeral 250.

Figure 11:
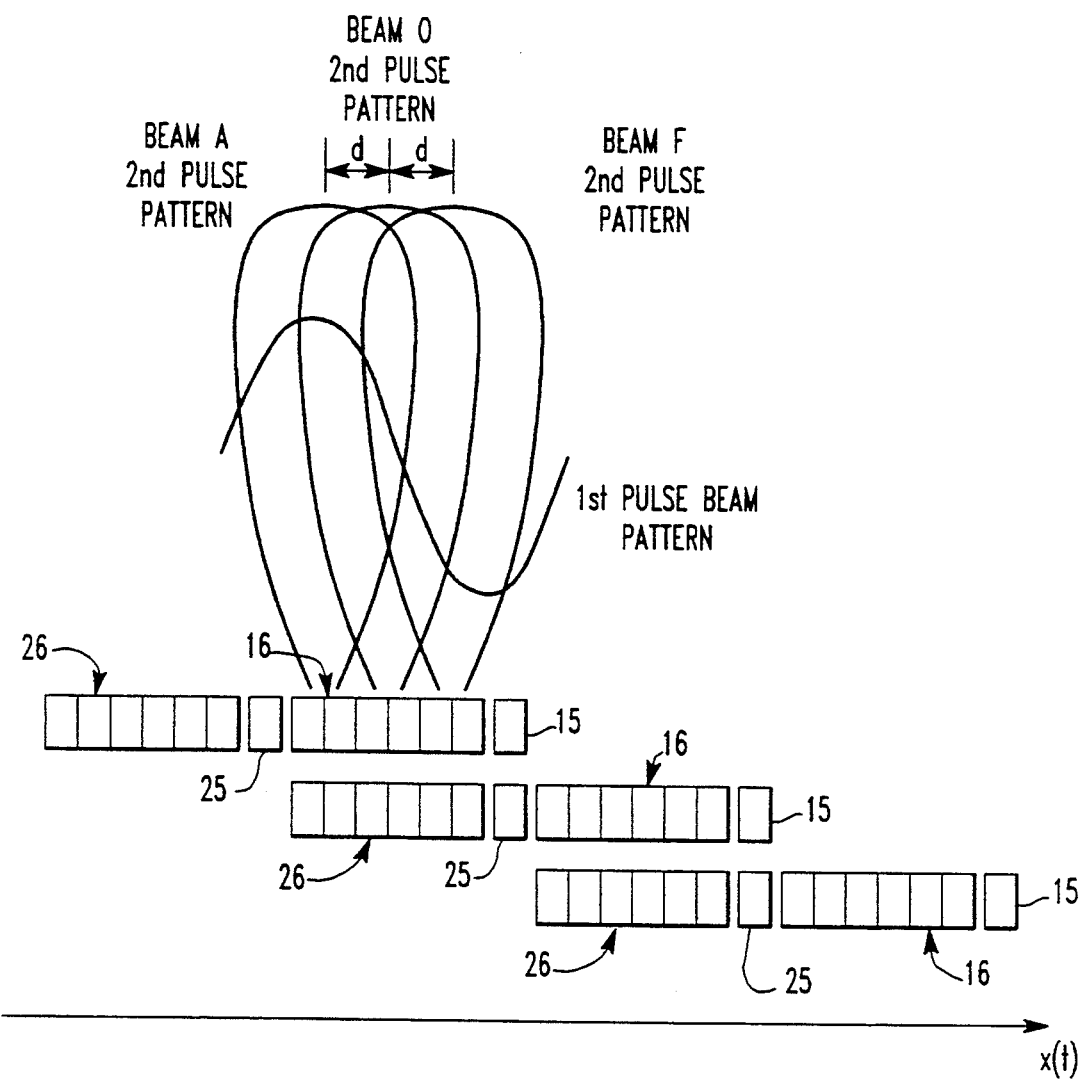
FIG. 11 is a diagram illustrating an overview of the operation of the modified version of the second embodiment of the present invention.

FIG. 11 shows examples of the pulse beam patterns for the modified version of the second embodiment. This is identical to FIG. 8 except that the labels on the patterns have been interchanged between "1st" and "2nd".

A third embodiment of the invention will now be described with reference to FIGS. 12–16 where like or similar parts are identified throughout the drawings by the same reference characters.

Figure 12:
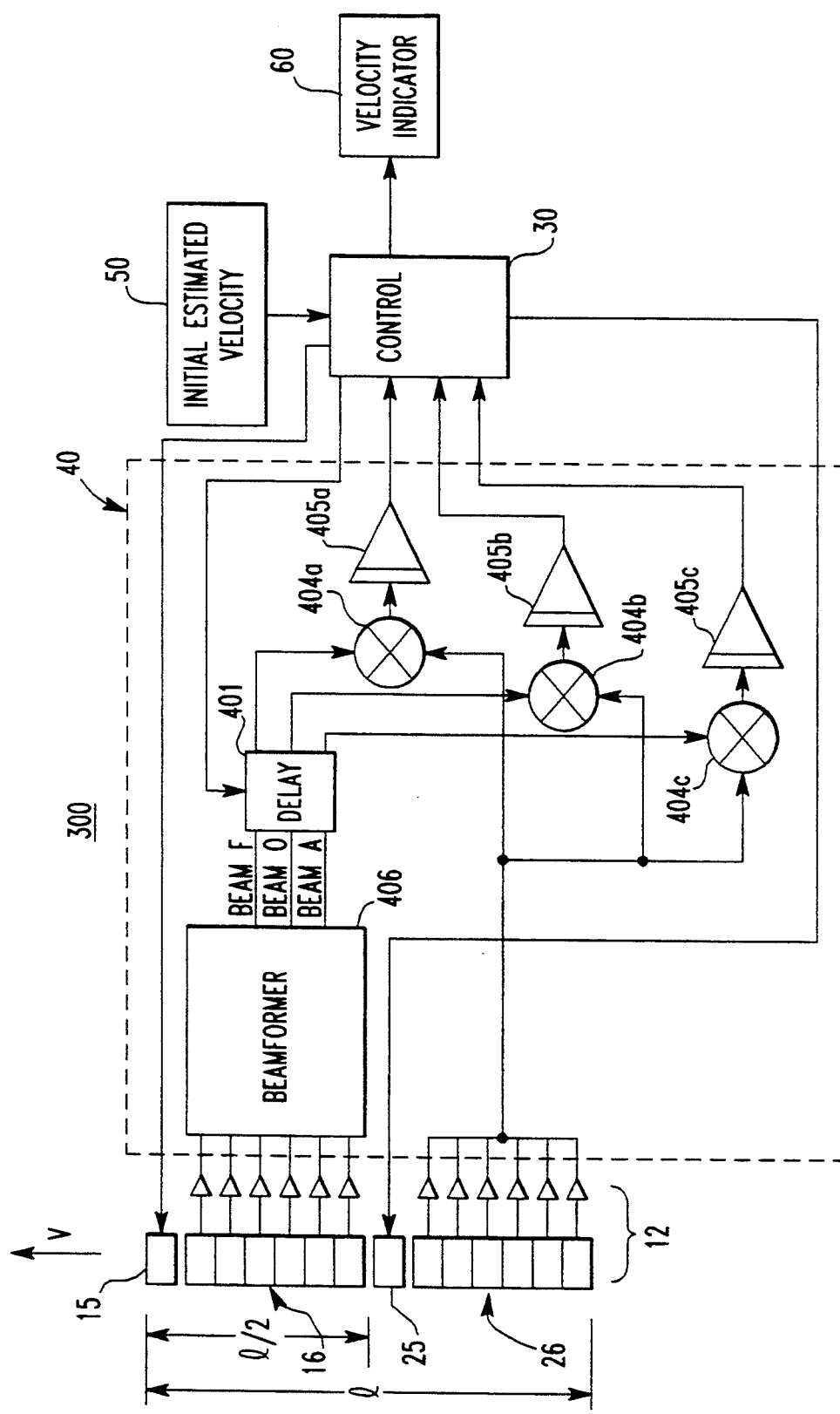
FIG. 12 is a schematic illustration of a third embodiment of the present invention.

The third embodiment of the velocity measuring apparatus of the present invention is shown in FIG. 12 and is designated generally by the reference numeral 300. Similar to the second embodiment, the third embodiment of velocity measuring apparatus 300 generally includes a linear sonar array 12, control means 30, signal processing means 40, and a velocity indicator 60. Velocity measuring apparatus 300 may further include means for providing an initial estimate of a vessel's velocity 50. However, in the third embodiment, signal processing means 40 is modified such that it does not include subtracting means 403.

Figure 13:
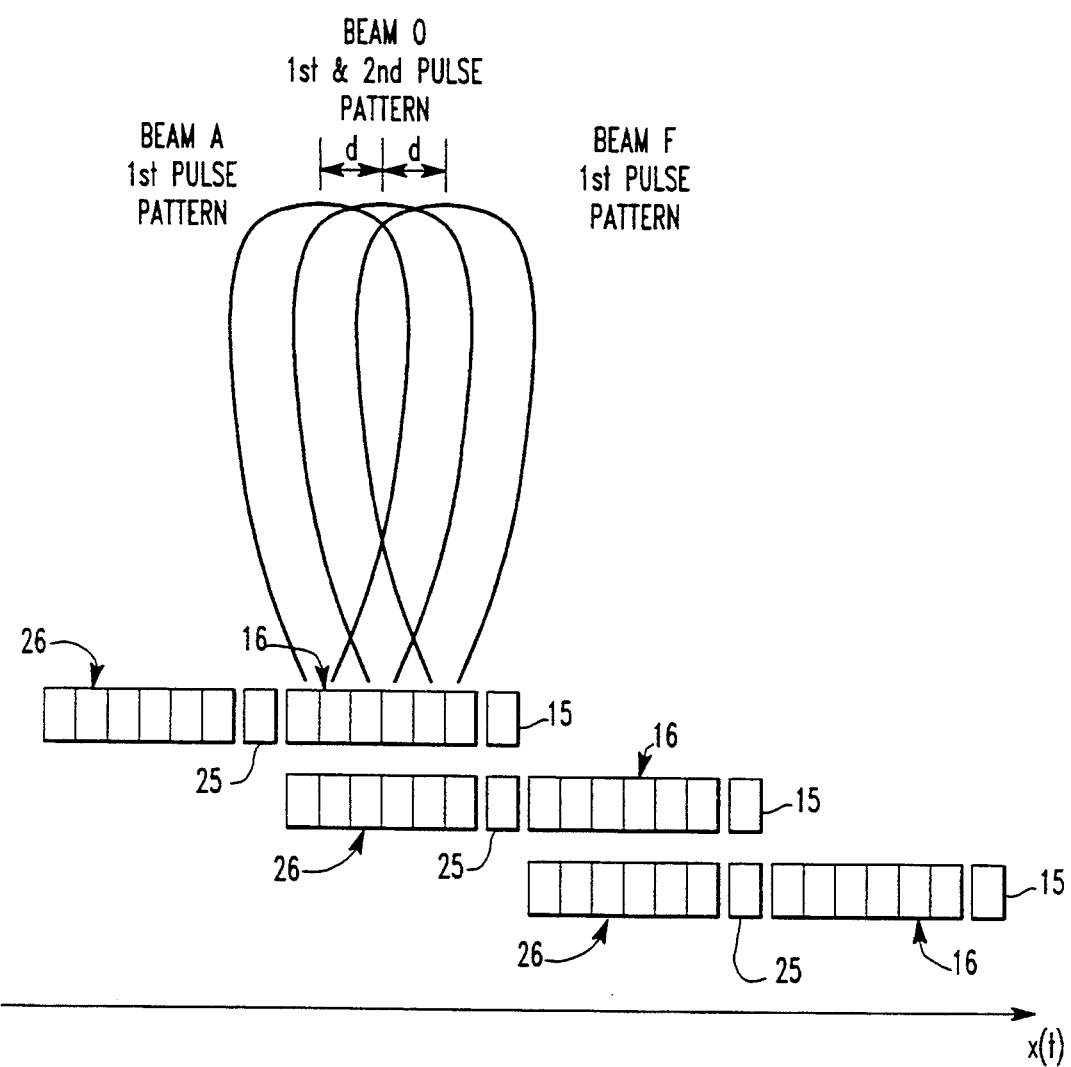
FIG. 13 is a diagram illustrating an overview of the operation of the third embodiment of the present invention.
Figure 15:
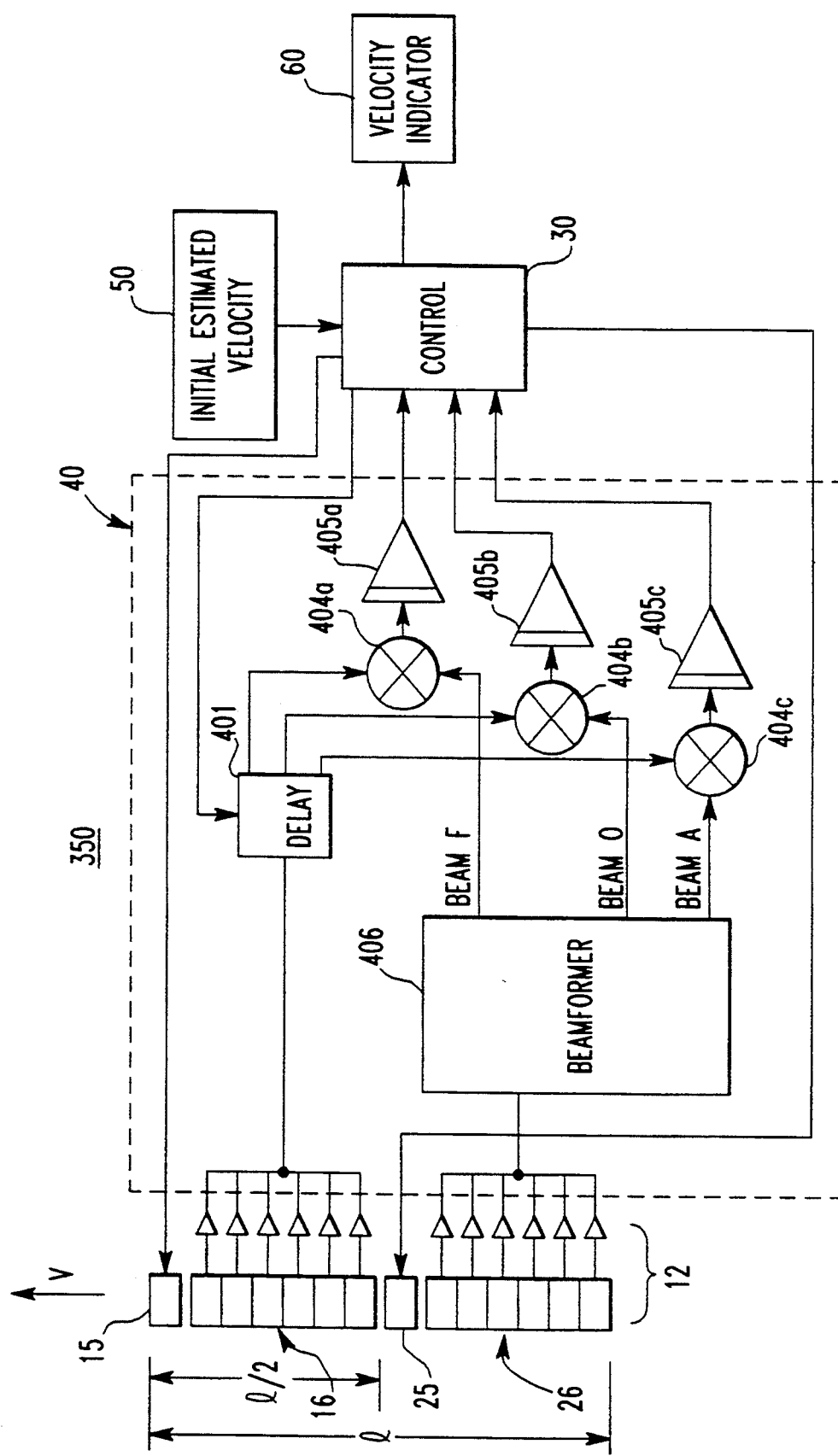
FIG. 15 is a schematic illustration of a modified version of the third embodiment of the present invention.

Instead of subtracting one half of the second reception signals from the other half, as in the second embodiment, the second reception signals are summed to form a beam. FIG. 13 shows examples of the resulting second pulse beam pattern which is identical to the first pulse beam pattern.

The third embodiment operates in substantially the same manner as the second embodiment insofar as the results of three correlations of shifted pulse beam patterns are used for interpolation to identify the best correlation point. However, because the second reception signals are summed rather than subtracted, the best correlation point shall be at the point having the maximum correlation result value.

Figure 14:
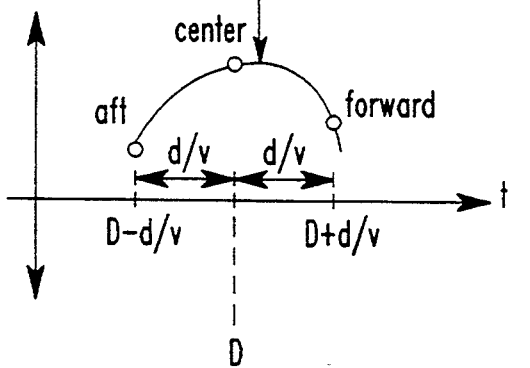
FIG. 14 is a graphic representation of the correlation result value as a function of time for the third embodiment of the present invention.

The maximum correlation result value can be interpolated from the correlations of the three different pulse beam patterns to provide an accurate estimate of the best correlation point. An example of this method is illustrated in FIG. 14.

Once the best correlation point is determined, the adjusted time delay D may be interpolated. For example, assuming the best correlation point (i.e., maximum correlation result value is estimated to have occurred half way between the center beam and the forward beam (spaced a distance d from the center beam), the adjusted time delay would be equal to $D+\frac{1}{2}d/V$.

Then, the value of the velocity V is updated using equation (2) above where D is the adjusted time delay. The recalculated value V is output from control means 30 to velocity indicator 60 and the process is repeated starting with Step 503 until the apparatus is turned OFF.

Velocity measuring apparatus 300 of the third embodiment can also be modified such that a single beam is delayed from the first transmission and the three beams are formed on the second transmission. A modified version of the third embodiment is shown in FIG. 13 and is designated generally by the reference numeral 350.

Figure 16:
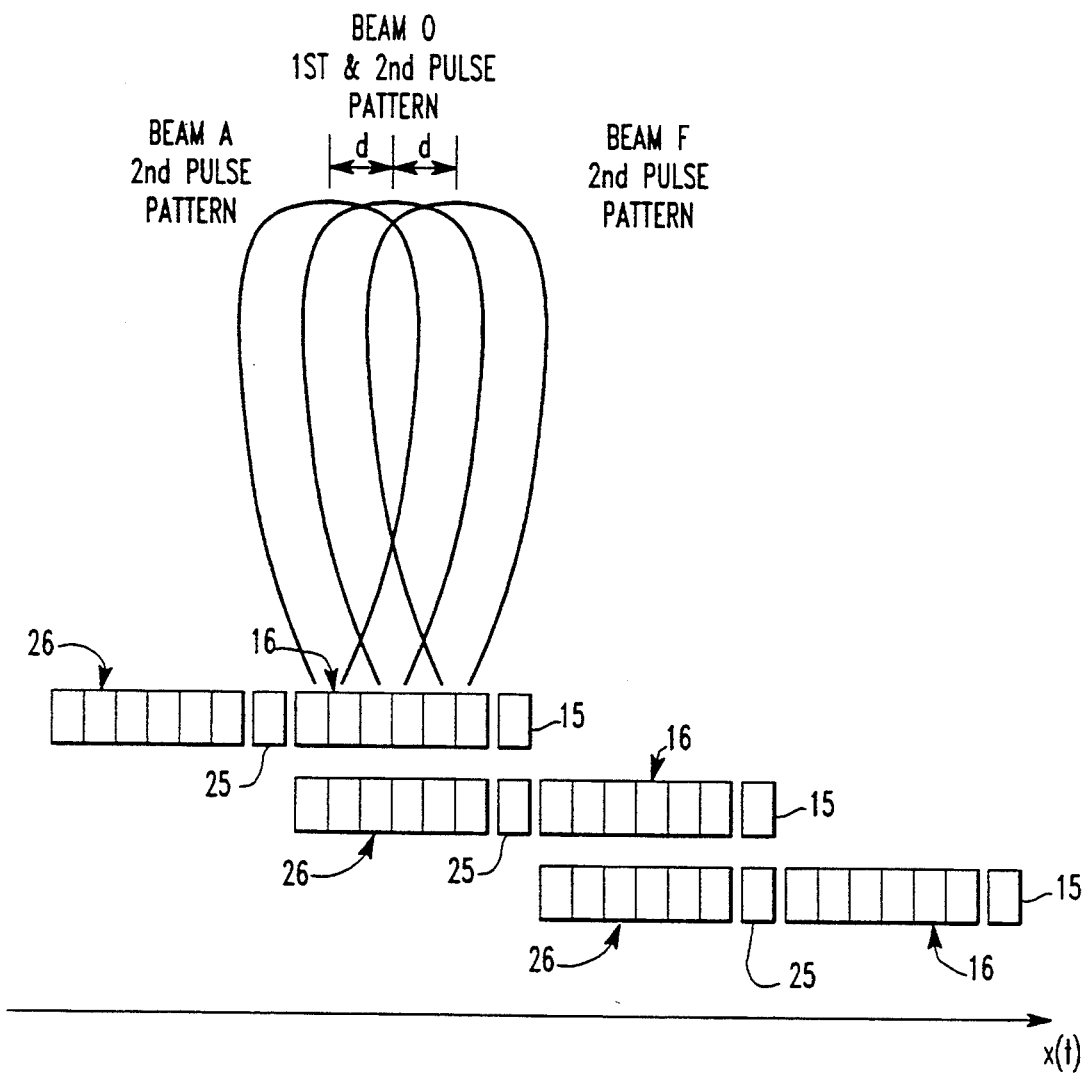
FIG. 16 is a diagram illustrating an overview of the operation of the modified version of the third embodiment of the present invention.

FIG. 16 shows examples of the pulse beam patterns for the modified version of the third embodiment. It is similar to FIG. 13 except that the three beams are formed on the second transmission.

In addition to the application of the present invention described above, the present invention could also be applied to two sides of the vehicle. This would allow additional accuracy by cancelling yaw rate if the vehicle is unstable and also give added accuracy in turns. As the vehicle yaws, the velocity for one side increases and that of the other decreases with the average being the best estimate of bottom speed.

The present invention could be combined with a technique to measure side slip of the vehicle to measure velocity in the direction orthogonal to vehicle travel. See, for example, U.S. Pat. No. 4,244,036 by R.S. Raven.

Additionally, the present invention could be applied to other applications such as radar, optics, or magnetic fields, as well as sonar.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An apparatus for measuring velocity relative to a reference plane, comprising:
   a linear sonar array disposed parallel to a direction along which velocity components are to be measured, including from a foremost position to a rearmost position:
   first transmitting means for transmitting a first sonar pulse,
   a plurality of first receiving means for receiving an echo of said first sonar pulse and for issuing first reception signals in response thereto, second transmitting means for transmitting a second sonar pulse, and a plurality of second receiving means for receiving an echo of said second sonar pulse and for issuing second reception signals in response thereto, said plurality of second receiving means corresponding in number to said plurality of first receiving means;

control means for transmitting a first control signal to said first transmitting means causing said first transmitting means to transmit said first sonar pulse, and for transmitting a second control signal to said second transmitting means after a predetermined time delay has lapsed following the transmission of said first control signal, said predetermined time delay being determined such that said second transmitting means is controlled to transmit said second sonar pulse when said second transmitting means is in the same position relative to the reference plane which said first transmitting means was in when said first transmitting means transmitted said first sonar pulse; and signal processing means for delaying the first reception signals by an amount of time equal to said predetermined time delay, and for correlating the delayed first reception signals with the second reception signals, wherein said control means adjusts the predetermined time delay based upon the correlation result in order to ensure that said second transmitting means is controlled by said control means to transmit said second sonar pulse when said second transmitting means is in the same position relative to the reference plane which said first transmitting means was in when said first transmitting means transmitted said first sonar pulse, and outputs a signal representative of the velocity relative to the reference plane.

2. The apparatus of claim 1, wherein said signal processing means comprises:

summing means for summing the first reception signals to provide a summed signal;

delay means for delaying the summed signal by an amount of time equal to said predetermined time delay;

subtracting means for subtracting a first half of the second reception signals from a second half of the second reception signals to provide a difference signal;

a multiplier for multiplying the delayed summed signal with the difference signal to provide a multiplied signal; and an integrator for integrating the multiplied signal to provide the correlation result.

3. The apparatus of claim 2, wherein said delay means comprises a buffer-type memory.

4. The apparatus of claim 2, wherein said signal processing means further comprises hard limit means, connected between said delay means and said multiplier for limiting the delayed summed signal.

5. The apparatus of claim 1, further comprising velocity indicating means for displaying the velocity relative to the reference plane in response to the signal representative of the velocity relative to the reference plane output by said control means.

6. The apparatus of claim 1, further comprising means for providing an initial estimated velocity relative to the reference plane, wherein said control means determines an initial predetermined time delay based upon the initial estimated velocity.

7. The apparatus of claim 2, wherein said control means increases the predetermined time delay by a predetermined unit of time when the correlation result is greater than zero, decreases the predetermined time delay by a predetermined unit of time when the correlation result is less than zero.

8. The apparatus of claim 1, wherein said signal processing means comprises:

beamforming means for receiving the first reception signals and forming three parallel beams, a forward beam signal, a center beam signal, and an aft beam signal;

delay means for delaying the forward beam signal, the center beam signal, and the aft beam signal by an amount of time equal to said predetermined time delay;

subtracting means for subtracting a first half of the second reception signals from a second half of the second reception signals to provide a difference signal;

branching means for branching an output of said subtracting means into a first path, a second path, and a third path;

a first multiplier for multiplying the delayed forward beam signal with the difference signal traversing said first path of said branching means to provide a first multiplied signal;

a second multiplier for multiplying the delayed center beam signal with the difference signal traversing said second path of said branching means to provide a second multiplied signal;

a third multiplier for multiplying the delayed aft beam signal with the difference signal traversing said third path of said branching means to provide a third multiplied signal;

a first integrator for integrating the first multiplied signal to provide a first correlation result;

a second integrator for integrating the second multiplied signal to provide a second correlation result; and a third integrator for integrating the third multiplied signal to provide a third correlation result.

9. The apparatus of claim 8, wherein said control means determines the adjustment of the predetermined time delay by interpolating the first, second, and third correlation results based upon values of a distance between the forward beam and the center beam and a distance between the aft beam and the center beam.

10. The apparatus of claim 1, wherein said signal processing means further comprises:

subtracting means for subtracting a first half of the first reception signals from a second half of the first reception signals to provide a difference signal;

delay means for delaying the difference signal by an amount of time equal to said predetermined time delay;

branching means for branching an output of said delay means into a first path, a second path, and a third path;

beamforming means for receiving the second reception signals and forming three parallel beams, a forward beam signal, a center beam signal, and an aft beam signal;

a first multiplier for multiplying the delayed difference signal traversing said first path of said branching means with the forward beam signal to provide a first multiplied signal;

a second multiplier for multiplying the delayed difference signal traversing said second path of said branching means with the center beam signal to provide a second multiplied signal;

a third multiplier for multiplying the delayed difference signal traversing said third path of said branching means with the aft beam signal to provide a third multiplied signal;

a first integrator for integrating the first multiplied signal to provide a first correlation result;

a second integrator for integrating the second multiplied signal to provide a second correlation result; and a third integrator for integrating the third multiplied signal to provide a third correlation result.

11. The apparatus of claim 10, wherein said control means determines the adjustment of the predetermined time delay by interpolating the first, second, and third correlation results based upon values of a distance between the forward beam and the center beam and a distance between the aft beam and the center beam.

12. The apparatus of claim 1, wherein said signal processing means comprises:

first summing means for summing the first reception signals to provide a first summed signal;

delay means for delaying the first summed signal by an amount of time equal to said predetermined time delay;

second summing means for summing the second reception signals to provide a second summed signal;

a multiplier for multiplying the delayed first summed signal with the second summed signal to provide a multiplied signal; and an integrator for integrating the multiplied signal to provide the correlation result.

13. The apparatus of claim 1, wherein said signal processing means comprises:

beamforming means for receiving the first reception signals and forming three parallel beams, a forward beam signal, a center beam signal, and an aft beam signal;

delay means for delaying the forward beam signal, the center beam signal, and the aft beam signal by an amount of time equal to said predetermined time delay;

summing means for summing the second reception signals to provide a summed signal;

branching means for branching an output of said summing means into a first path, a second path, and a third path;

a first multiplier for multiplying the delayed forward beam signal with the summed signal traversing said first path of said branching means to provide a first multiplied signal;

a second multiplier for multiplying the delayed center beam signal with the summed signal traversing said second path of said branching means to provide a second multiplied signal;

a third multiplier for multiplying the delayed aft beam signal with the summed signal traversing said third path of said branching means to provide a third multiplied signal;

a first integrator for integrating the first multiplied signal to provide a first correlation result;

a second integrator for integrating the second multiplied signal to provide a second correlation result; and a third integrator for integrating the third multiplied signal to provide a third correlation result.

14. The apparatus of claim 13, wherein said control means determines the adjustment of the predetermined time delay by interpolating the first, second, and third correlation results based upon values of a distance between the forward beam and the center beam and a distance between the aft beam and the center beam.

15. The apparatus of claim 1, wherein said signal processing means further comprises:

summing means for summing the first reception signals to provide a summed signal;

delay means for delaying the summed signal by an amount of time equal to said predetermined time delay;

branching means for branching an output of said delay means into a first path, a second path, and a third path;

beamforming means for receiving the second reception signals and forming three parallel beams, a forward beam signal, a center beam signal, and an aft beam signal;

a first multiplier for multiplying the delayed summed signal traversing said first path of said branching means with the forward beam signal to provide a first multiplied signal;

a second multiplier for multiplying the delayed summed signal traversing said second path of said branching means with the center beam signal to provide a second multiplied signal;

a third multiplier for multiplying the delayed summed signal traversing said third path of said branching means with the aft beam signal to provide a third multiplied signal;

a first integrator for integrating the first multiplied signal to provide a first correlation result;

a second integrator for integrating the second multiplied signal to provide a second correlation result; and a third integrator for integrating the third multiplied signal to provide a third correlation result.

16. The apparatus of claim 15, wherein said control means determines the adjustment of the predetermined time delay by interpolating the first, second, and third correlation results based upon values of a distance between the forward beam and the center beam and a distance between the aft beam and the center beam.

17. The apparatus of claim 1, wherein said signal processing means comprises:

subtracting means for subtracting a first half of the first reception signals from a second half of the first reception signals to provide a difference signal;

delay means for delaying the difference signal by an amount of time equal to said predetermined time delay;

summing means for summing the second reception signals to provide a summed signal;

a multiplier for multiplying the delayed difference signal with the summed signal to provide a multiplied signal; and an integrator for integrating the multiplied signal to provide the correlation result.

18. The apparatus of claim 17, wherein said signal processing means further comprises hard limit means, connected between said summing means and said multiplier for limiting the summed signal.

19. The apparatus of claim 17, wherein said control means increases the predetermined time delay by a predetermined unit of time when the correlation result is greater than zero, decreases the predetermined time delay by a predetermined unit of time when the correlation result is less than zero.

20. A method for measuring velocity relative to a reference plane using a linear sonar array disposed parallel to a direction along which velocity components are to be measured, comprising the steps of:

transmitting a first sonar pulse from a first transmitter located in the foremost position in the linear sonar array;

receiving an echo of the first sonar pulse in a plurality of first receivers located in the linear sonar array adjacent to the first transmitter;

issuing first reception signals in response to the reception of the echo of the first sonar pulse;

transmitting a second sonar pulse from a second transmitter located in the linear sonar array adjacent to the plurality of first receivers after a predetermined time delay has lapsed following the transmission of the first sonar pulse, said predetermined time delay being determined such that the second transmitter transmits the second sonar pulse when the second transmitter is in the same position relative to the reference plane which the first transmitter was in when the first transmitter transmitted the first sonar pulse;

receiving an echo of the second pulse in a plurality of second receivers located in the linear sonar array adjacent to the second transmitter;

issuing second reception signals in response to the reception of the echo of the second sonar pulse;

delaying the first reception signals by an amount of time equal to said predetermined time delay;

correlating the delayed first reception signals with the second reception signals;

adjusting the predetermined time delay based upon the correlation result in order to ensure that the second transmitter transmits the second sonar pulse when the second transmitter is in the same position relative to the reference plane which the first transmitter was in when the first transmitter transmitted the first sonar pulse; and calculating and outputting the velocity relative to the reference plane by using the adjusted value of the predetermined time delay.

* * * * *